Patented Apr. 29, 1924.

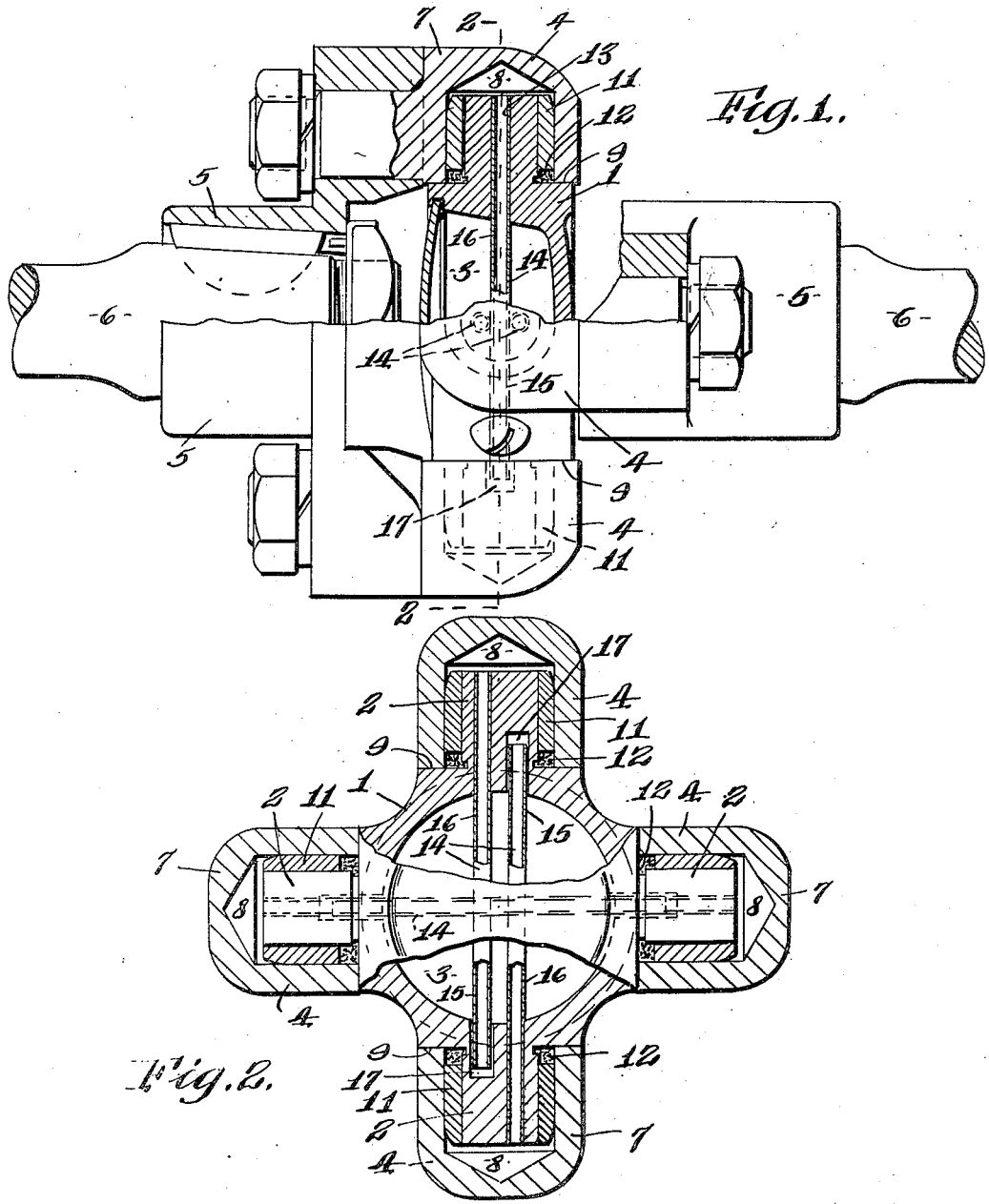

1,492,351

UNITED STATES PATENT OFFICE.

JOHN L. BURNS, OF SYRACUSE, NEW YORK, ASSIGNOR TO H. H. FRANKLIN MANUFACTURING COMPANY, OF SYRACUSE, NEW YORK, A CORPORATION OF NEW YORK.

LUBRICATING MEANS FOR MOTION-TRANSMITTING JOINTS.

Application filed May 14, 1921. Serial No. 469,539.

*To all whom it may concern:*

Be it known that I, JOHN L. BURNS, a citizen of the United States, and a resident of Syracuse, in the county of Onondaga and State of New York, have invented a certain new and useful Lubricating Means for Motion-Transmitting Joints, of which the following is a specification.

This invention has for its object a lubricating system or means for motion transmitting mechanism including rotating elements wherein the oil is thrown centrifugally from a central reservoir and especially a system or means for lubricating the bearings such as those of universal joints where the yokes are connected to a central member by being mounted on radial trunnions on the central member, by which system or means the pressure of the oil in the bearings due to the centrifugal action is limited to that of a column of oil substantially equal to the length of the trunnion, or in other words, the pressure of the oil in the bearing is not affected or increased by the centrifugal force of the oil in the central oil reservoir.

The invention consists in the novel features and in the combinations and constructions hereinafter set forth and claimed.

In describing this invention, reference is had to the accompanying drawings in which like characters designate corresponding parts in all the views.

Figure 1 is an elevation, partly in section of a universal joint embodying my invention.

Figure 2 is a sectional view on line 2—2, Fig. 1.

The invention is here shown as embodied in a universal joint although obviously it may be used in any mechanism where a central rotating oil reservoir is used to lubricate bearings outside of the reservoir. Heretofore in mechanisms such as universal joints where radial bearings as the trunnions are lubricated from a central reservoir the lubricant has been conducted from the central reservoir through a lengthwise passage or duct in the trunnion to the outer end of the trunnion from whence it is forced inwardly along the outside trunnion or between the trunnion and bearing thereon. Owing to the centrifugal force of the oil in the reservoir through this duct, the pressure is so great that the oil is forced at the base of the trunnion out of the bearing.

This invention relates to means or constructions by which the centrifugal force of the oil in the central reservoir is ineffective on the oil in the bearing so that only the pressure of the oil in the bearing is that due to the centrifugal action on a column of oil substantially equal to length of the bearing or the length of the trunnion so that the pressure of the oil radially inwardly along the outside of the trunnion or bearing substantially balances the pressure of the oil outwardly due to centrifugal action. An under balance or an overbalance may be readily accomplished if desired by varying the relative lengths of the legs of the pipe hereinafter described.

This invention comprises generally, a rotating member having a radial trunnion, a second member having a journal bearing mounted on the trunnion and closed at its outer end and engaging at its inner end with the former member around the base of the trunnion, the second member having an oil recess beyond the end of the trunnion, the first member having a central oil reservoir and the trunnion being formed with a lengthwise passage opening into the reservoir and into the oil recess, and means for preventing the centrifugal force of the oil in the reservoir from being transferred through such passage.

1 designates a rotating member as a central member or spider of a universal joint, said member being formed with diametrically opposite trunnions 2 and a central oil reservoir 3. 4 are end members of a universal joint which have suitable hubs 5 for connection to the shafts as 6 connected together by the universal joint, these members being in the form of yokes having cup-shaped journal bearings 7 on the trunnions which bearings are closed at their outer ends and formed with oil recesses 8 beyond the end of the trunnions 2 and which at their inner ends engage annular bearing faces 9 on the member 1 around the base of the trunnions 2. Each bearing includes a suitable bushing 11 around the trunnion and a packing disk 12 interposed between the inner end of the bushings and the bearing faces 9.

13 is a passage or duct extending lengthwise of each trunnion 2 and opening at its outer end into the recess 8 and at its inner end into the oil reservoir.

The means for limiting the pressure of the oil in each bearing 2 to substantially the pressure of the column of oil in the passage 13, that is, the means for preventing the pressure of the oil in the chamber 3 due to the centrifugal action from being transferred to each bearing 7 through the passage 13 as here shown comprises a pipe 14 extending into the reservoir 3 and fitted at one end into the passage 13. The portion of the pipe 14 within the reservoir 3 including legs 15 and 16 extending outwardly relatively to the axis of the reservoir, these legs being preferably of substantially the same length so that the oil in each leg is thrown outwardly away from the oil in the other leg, and hence the tendency of oil in one leg to be thrown outwardly is neutralized by the same tendency in the other leg for the reason that the small size of the hole in the pipe, the capillary attraction between the oil and the tube, and the effect of any vacuum formed between the columns of oil in the legs, tend to hold the columns of oil in the legs from outward movement. As here illustrated, each tube 14 extends diametrically of the chamber 3 and is fitted in the passage 13 of the trunnion substantially the full length of the passage and extends at its end remote from the passage into a well 17 in the diametrically opposite trunnion. The well 17 is of greater diameter than the pipe and the pipe stops short of the bottom of the well so that the oil may flow into the well and into the end of the pipe when the joint is not rotating. The oil in the well also forms an oil seal at the end of each pipe during rotation of the bearing. Hence, the pipes and oil recesses are filled only when the joint stops rotating.

Preferably, the legs of each pipe within the oil reservoir on opposite sides of the axis thereof are equal or substantially equal although by varying the length of one leg relatively to the other, the pressure may be varied in the bearing 13. However, preferably, these legs are of equal length in order that the pressure due to the centrifugal force of the column of oil in the passage 13 from the base of the trunnion to the end thereof may neutralize the centrifugal action of the oil between the bushing and the periphery of the trunnion. The passage 13 or the portion of the pipe therein holds enough oil to lubricate the bearing for an indefinite time. When the vehicle stops or the universal joint stops rotating the passages refill. Obviously, by my invention, the pressure of the oil in the bearing is not sufficient to force it out past the felt washer 12.

What I claim is:

1. In a motion transmitting mechanism the combination of a rotating member having a radial trunnion and a second member having a journal bearing on the trunnion, such bearing being closed at its outer end and formed with an oil recess at the end of the trunnion, and engaging at its inner end around the base of the trunnion with the first member, the first member having a central oil reservoir, the trunnion being formed with a passage extending lengthwise thereof and opening into the recess and into the reservoir and means for conducting oil from the reservoir to the recess through the passage, said conducting means being arranged so that the centrifugal force acts in opposite directions on the column of oil in the conducting means, whereby the oil in the passage of the trunnion opposes the pressure of the oil between the trunnion and the bearing.

2. In a motion transmitting mechanism, the combination of a rotating member having a radial trunnion and a second member having a journal bearing on the trunnion, such bearing being closed at its outer end and formed with an oil recess at the end of the trunnion and engaging at its inner end around the base of the trunnion with the first member, the first member having a central oil reservoir, the trunnion being formed with a passage extending lengthwise thereof and opening into the recess, and a pipe communicating with the recess through such passage, the pipe extending into said reservoir and being opened at its end remote from the passage, substantially as and for the purpose set forth.

3. In a motion transmitting mechanism, the combination of a rotating member having a radial trunnion and a second member having a journal bearing on the trunnion, such bearing being closed at its outer end and formed with an oil recess at the end of the trunnion and engaging at its inner end around the base of the trunnion with the first member, the first member having a central oil reservoir, the trunnion being formed with a passage extending lengthwise thereof and opening into the recess, a pipe communicating with the recess through such passage, the pipe extending into said chamber and being open at its end remote from the passage, the portion of the pipe in the chamber including legs extending outwardly relatively to the axis of the reservoir whereby the throw of oil in one leg outwardly is away from the oil in the other leg, substantially as and for the purpose specified.

4. In a motion transmitting mechanism, the combination of a rotating member having a radial trunnion and a second member having a journal bearing on the trunnion, such bearing being closed at its outer end and formed with an oil recess at the end of the trunnion and engaging at its inner end around the base of the trunnion with the first member, the first member having a central oil reservoir, the trunnion being formed with a passage extending lengthwise thereof and opening into the recess, a pipe communicating with the recess through such passage, the pipe extending into said chamber and being open at its end remote from the passage, the portion of the pipe in the chamber including legs of substantially equal length extending outwardly relatively to the axis of the reservoir whereby the throw of the oil in each leg is outwardly away from the oil in the other leg and the centrifugal force of the leg in each leg neutralizes that in the other leg, substantially as and for the purpose set forth.

5. In a motion transmitting mechanism, the combination of a rotating member having a radial trunnion and a second member having a journal bearing on the trunnion, such bearing being closed at its outer end and formed with an oil recess at the end of the trunnion and engaging at its inner end around the base of the trunnion with the first member, the first member having a central oil reservoir, the trunnion being formed with passages extending lengthwise thereof, and opening into the recess, a pipe communicating with the recess through such passage, the pipe extending diametrically across the reservoirs and being open at its end remote from the passage, the portions of the pipe on opposite sides of the axis of the reservoir constituting legs extending outwardly relatively to the axis of the reservoir whereby the throw of oil in one leg outwardly is away from the oil in the other leg, substantially as and for the purpose described.

6. In a motion transmitting mechanism, the combination of a rotating member having a radial trunnion and a second member having a journal bearing on the trunnion, such bearing being closed at its outer end and formed with an oil recess at the end of the trunnion and engaging at its inner end the first member around the base of the trunnion, the first member having a central oil reservoir, the trunnion having a passage extending lengthwise thereof and opening into the recess, a pipe communicating with the recess through such passage, the pipe extending diametrically across the reservoir and being open at its end remote from the passage, the portions of the pipe in the chamber on opposite sides of the axis of the reservoir being of equal length and constituting such axis whereby the throw of oil in one leg outwardly balances the throw of the oil in the other leg, substantially as and for the purpose specified.

7. The combination of a rotating member having diametrically opposite radial trunnions and a second member having bearings on the trunnions respectively, said bearings being closed at their outer ends and formed with oil recesses at the ends of the trunnions, the inner ends of the bearings engaging the first member around the bases of the trunnions, the first member being formed with a central reservoir and the trunnions being formed with lengthwise passages opening into the reservoir and into the oil recesses, and a pipe fitted in the passage of each trunnion and extending transversely of the oil chamber and terminating near the opposite trunnion, substantially as and for the purpose set forth.

8. The combination of a rotating member having diametrically opposite radial trunnions and a second member having bearings on the trunnions respectively, said bearings being closed at their outer ends and formed with oil recesses at the ends of the trunnions, the inner ends of the bearings engaging the first member at the bases of the trunnions, the first member being formed with a central reservoir and the trunnions being formed with lengthwise passages opening into the reservoir and into the oil recesses and also with wells extending lengthwise of the trunnions and opening at their inner ends into the oil chamber and terminating at their outer ends short of the ends of the respective trunnions, a pipe fitted in each passage and extending transversely of the oil chamber and terminating in the well of the opposite trunnion, said wells being of greater diameter than the pipes and the pipes terminating short of the bottoms of the wells whereby the oil may flow from the reservoir into the wells and into the ends of the pipes, substantially as and for the purpose described.

In testimony whereof, I have hereunto signed my name at Syracuse, in the county of Onondaga, and State of New York, this 10th day of March, 1921.

JOHN L. BURNS.